United States Patent Office 2,834,516
Patented May 13, 1958

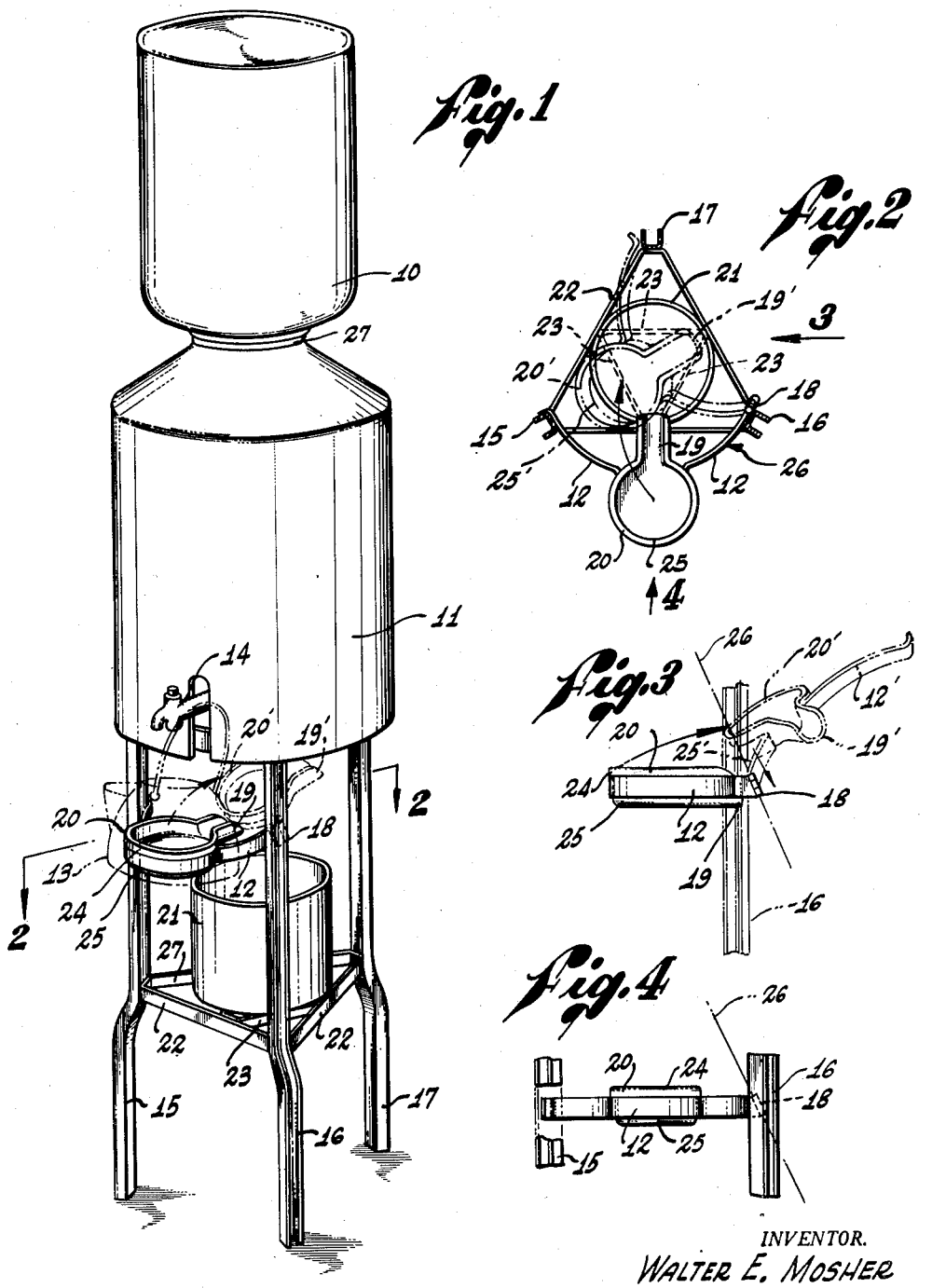

2,834,516

NON-SPILLING MOVABLE DRIP CATCHER

Walter E. Mosher, North Hollywood, Calif.

Application June 14, 1955, Serial No. 515,467

9 Claims. (Cl. 222—108)

The present invention relates to drip catchers for use with liquid dispensing equipment and more particularly to drip catchers which may be easily moved out of the way without causing spillage.

Previous drip catching devices which rotate in a horizontal plane from their normal position beneath a faucet have the disadvantage that liquid remaining in the drip pan is spilled out through the spout when the device is rotated.

A major object of this invention is to solve the foregoing problem by providing a drip catcher which when moved out from beneath its associated liquid dispenser will not spill liquid out through its spout.

Another object of the invention is to provide a drip catcher which when moved out of the way from beneath a liquid dispensing faucet will of itself tend to return to its original position beneath said faucet.

A further object of this invention is to provide means for recovering valuable liquids which ordinarily are lost when spilled out of their containers.

A still further object of the invention is to provide means for keeping the area around a liquid dispensing device clean from spillage.

It is also an object of the invention to provide a drip pan which when moved from beneath a faucet has its exit portion rise upwardly farther than the heel portion of said pan.

Another object of this invention is to provide means into which liquid retreats without spilling when the drip pan is pushed from beneath the liquid dispensing member.

The above and other objects of the invention will become apparent from the following description of a preferred form of my invention and from the accompanying drawings in which:

Figure 1 is a perspective view showing my drip catcher in operative relation with a bottled-water dispenser, Figure 2 is a sectional plan view of the drip catcher structure taken along the line 2—2 of Figure 1, Figure 3 is a fragmentary side view taken in the direction of arrow 3 of Figure 2 showing the operation of the drip catcher, and Figure 4 is a fragmentary front view taken in the direction of arrow 4 of Figure 2 showing the relationship of the hinge with the drip catcher.

In synopsis, the invention comprises a drip pan swingably mounted beneath a faucet in position to catch drops of liquid falling therefrom. When a sufficient quantity of liquid accumulates, in the pan, it flows out through a rear exit or spout into a catch basin. When one desires to fill a container from beneath the faucet, the pan is swung to the rear to make way for the container. An arm attached to the pan swings from a hinge which is so tilted that when the pan swings rearwardly the spilling edge tilts upward relative to the rest of the pan thereby preventing any liquid contained in the pan from spilling out. When the drip catcher has been moved rearwardly, it tends to return to its original position beneath the faucet and an arm is provided on the catcher to limit its return motion to its original position.

Referring now to the drawing and particularly to Figure 1, the numeral 10 indicates a water filled, narrow-necked glass bottle which is inverted and rests on a rubber ring on top of a metal housing 11. The whole device is supported on a metal framework having legs 15, 16 and 17.

The water from the glass bottle 10 is conveyed by customary means to a dispensing faucet 14 protruding through the lower portion of housing 11. In order to catch any drops of water that might accidentally escape from faucet 14, a drip pan 20 is mounted beneath the faucet. When a quantity of water has accumulated in the drip pan 20, it flows out over the spill edge of a spout 19 located at the rear of the pan from whence it falls into a catch basin 21 placed beneath the spout 19. The catch basin 21 is emptied as required. For this purpose it is removably placed on top of a double triangular support attached to the supporting legs.

The support for the catch basin 21 is provided by three metal cross pieces 23 connected in a triangular shape and attached to the middle portion of three other metal cross pieces 22 likewise forming a triangular shape. The cross pieces 23 are attached to the three supporting metal legs 15, 16 and 17. This triangular supporting framework not only provides support for the catch basin 21 but adds rigidity to the tripod framework.

The drip pan 20 is supported in its normal position beneath the faucet 14 by a metal strap 12 which forms a cross piece between front legs 15 and 16 of the framework. In previous structures of this general type the metal strap 12 has been rigidly attached to legs 15 and 16. In my invention the strap 12 merely rests against the rear of front leg 15 and is attached by a hinge 18 to front leg 16.

The drip pan held in place by strap 12 may be ordinary crockery and except for rear spout 19 is formed with a circular flat bottom and vertical sides. The underneath construction of said pan is immaterial. The upper portion of the sides extends outwardly providing a slight flange 24.

The crockery pan as just described is frequently called a T or T-shaped jar in the trade. As is obvious, the trunk of the T is formed by the spout and the cross bar of the T passes from one side to the other of the described jar as shown in Figure 2.

The cross piece 12 consists of a long metal strap, the middle portion of which is formed into a nearly closed circle that fits around the outside of the pan 20. The spout of pan 20 protrudes through the unclosed portion of the circle formed by the strap 12. The flange 24 of the pan 20 rests on the top side of the strap 12 and helps to keep the pan fixed relative to the position of the strap. The ends of the strap are bent back and describe two segments of an arc of the same circle extending from the sides of the pan near the spout to the two front legs 15 and 16 which they contact as above described. As will be noticed from Figure 2 the cross piece 12 is so disposed that pan 20 is positioned forward of the axis of hinge 18.

As mentioned, the strap 12, constituting a cross piece between front legs 15 and 16, is rotatably mounted to leg 16 by a hinge 18. One of the unique features of my invention is the structural arrangement of this hinge 18. This feature consists in the tilt given to the axis of this hinge. From Figure 3 it can be seen that the upper portion of axis 26 of the hinge 18 is tilted forward. At the same time by reference to Figure 4 it can be seen that this same upper portion of axis 26 of the hinge 18 is also tilted inwardly toward the drip catcher.

With the hinge 18 doubly inclined as shown in Figure 3 and Figure 4, when I swing the drip pan 20 rearwardly from the position in which it normally rests beneath the spigot 14, about the inclined axis of hinge 18, the lip 19 of the spout will rise faster than will the heel 25 located at the front end of the drip pan. As a result, liquid in the drip pan tends to fall back from the spill edge of the spout portion towards the heel 25 of the pan, assuming, of course, that the drain surface of the pan is not tipped forwardly when in normal position.

This is especially beneficial when one desires to bring a container such as a tea kettle 13, for example, and place it beneath the faucet 14 for filling with water. Since the drip pan 20 is rotatably mounted to leg 16, the tea kettle 13 is merely pushed against the pan 20 whereupon the pan moves back to the broken line position 20', while the tea kettle occupies the position shown in broken lines. Since the tip of the spout 19 moves to the position 19' which is higher than the position 25' to which the heel 25 moves, any liquid which has not yet flowed over the spill edge of the spout is thereby retained in the pan 20 when moved rearwardly.

As can be seen from a study of the plane of rotation through which the drip pan turns while rotating about the axis 26 of hinge 18, the condition where lip 19 rises faster than heel 25 is only true during that part of the rotation which is less than 90°. However, such a limiting condition for the operation of my invention does not detract from its utility. As can be seen from Figure 2, the rotation of the drip catcher from position 20 to broken line position 20' is less than 90°. This angle of rotation is sufficient to obtain the desired beneficial result.

The length of the cross piece 12 from the hinge axis 26 to the pan 20 is immaterial to the operation of my invention. The angle in any given case through which the beneficial result is obtained remains the same. As the supporting cross piece 12 between the hinge axis and the pan is lengthened, the length of the arc through which the beneficial results are obtained is increased.

As can be seen by reference to Figure 2, the rotation of the drip pan 20 is limited to an angle of less than 90° by the structure shown in the preferred embodiment. The free-swinging end of the cross piece 12 impinges upon the back leg 17 of the supporting framework and acts as a limiting stop for the rotation of the drip catcher 20.

This limitation upon the rotation of the drip catcher does not act to destroy the beneficial result otherwise obtainable. In normal operation the free-swinging end of the cross piece 12 does not strike the rear supporting leg 17 with any force. If it were to do so, the inertia of the liquid contained in the drip catcher could conceivably cause it to spill out over the lip 19. However, the force required or the push exerted to cause the drip catcher 20 to move from its normal position beneath the faucet 14 is expended in causing the upwardly inclined rotational motion of the drip catcher. As a result, when the free-swinging end of the cross piece 12 reaches a position adjacent the rear leg 17 its motion has almost stopped.

Another beneficial result obtained from tilting the axis 26 of the hinge 18 is a tendency of the drip catcher to return to its normal position beneath the faucet 14. The device takes advantage of the principle that the center of gravity of any system tends to assume the lowest position under stable conditions.

When the drip pan 20 is pushed in a rearwardly direction by a tea kettle 13 placed under spigot 14 or so moved by any other force, the entire drip catching device starts to rotate upwardly along an inclined plane. In so doing the center of gravity of the entire system is elevated above its former position. Consequently, in the absence of any restraining force, the center of gravity of the system tends to lower itself by rotating downwardly along the above mentioned inclined plane until the free-swinging end of the cross piece 12 comes to rest against the rear of leg 15. As can be clearly seen by reference to Figures 1 and 2, when the cross piece 12 comes in contact with leg 15, drip pan 20 is so positioned by the cross piece 12 that at that time it lies directly beneath faucet 14.

As a result of this twofold beneficial result, namely, the tendency of the pan 20 to return to its normal position beneath faucet 14 and of its tilting to prevent spilling of any of the liquid when it is pushed in a rearwardly direction, valuable liquids which might otherwise be lost due to spilling or dripping on the floor can be recovered.

The operation of the device can also be described by reference to two concentric cones. The axis 26 of hinge 18 constitutes the line on which the apex point of any cone would lie. One cone is generated by a line drawn from an apex point on the axis 26 to the lowermost point on the spill edge of the drain surface of spout 19. From this latter point on spout 19 a horizontal reference line is drawn forward along the surface of the water in pan 20 towards the heel 25. Another cone is made by a line drawn connecting the forwardmost point of this horizontal reference line to the same apex point on the axis 26 of the hinge 18.

The cones generated by these two lines are concentric and as they rotate, the spout end of the horizontal reference line, drawn from the spout to the heel of the pan 20, tilts upward. As it tilts upwardly, the water in the pan 20 moves to the heel portion preventing spilling therefrom.

Another way to describe the operation of the device is to consider two intersecting planes. A vertical plane is determined by the tilted axis 26 of hinge 18. Another vertical plane is specified by the horizontal reference line described above as proceeding from the spout 19 to the heel of drip catcher 20.

The above mentioned vertical planes intersect somewhere forward of spout 19. Likewise the upward portion of axis 26 of hinge 18 is tilted toward the line of intersection of the planes. When these conditions are fulfilled, the spout end of the horizontal reference line tilts upward as the drip catcher is rotated rearwardly, thereby preventing the spilling of water therefrom.

While in the preferred form of my invention I tilt the axis 26 of hinge 18 both forwardly and inwardly as hereinbefore described, it will be understood that with a T-shaped pan as shown, beneficial results are nevertheless obtained by tipping in one direction only.

In other words, if I forwardly but not inwardly tilt the upper portion of axis 26, then, when I move the pan 20 in a rearwardly direction, it rises along an inclined plane, and no spilling therefrom occurs. In this case, as the pan 20 rises, the side of the pan adjacent the axis 26 becomes lower than the lip of the spout 19. As a result, any water in the pan or near the lip falls down into the lower side. In consequence, water is prevented from spilling out of the pan.

While the form of my invention shown and described herein is fully capable of achieving the objects and providing the advantages hereinbefore stated, it will be realized that it is capable of considerable modification without departure from the spirit of the invention. For this reason, I do not mean to be limited to the form shown and described but rather to the scope of the appended claims.

I claim:

1. A drip catcher for use with a liquid dispensing member comprising: a framework supporting said drip catcher; a pan having a rear exit and formed with the lowermost drain surface comprising a horizontal reference line extending from inside the pan to the spill edge of the exit; stop means limiting the forward location of said pan to a position beneath said member; an arm extending laterally from said pan; and a hinge joining said arm to said framework, said hinge having a forwardly tilting upper portion of the axis so disposed that the vertical planes passing through said axis and said line intersect forward of said exit, whereby liquid is prevented from spilling out of said pan as it part way rotates about the axis of said hinge.

2. A movable drip catcher for use beneath a liquid dispensing faucet comprising: three equally spaced supporting legs rigidly united together having two in the front and one in the rear; a circular pan having a flat bottom surface, upturned sides, and a short rear exit spout so disposed that a generally horizontal reference line lies along said bottom from the front portion to the spout; a cross piece medially supporting said pan so that one end of said cross piece so touches a front leg at its rear that said pan is normally positioned beneath said faucet; and a hinge uniting the other end of said cross piece to the other front leg, the upper portion of the axis of said hinge being so tilted forwardly that the vertical planes passing through said axis and said line intersect forward of said spout, whereby said pan is rearwardly swingable from beneath said faucet without spilling liquid therefrom.

3. A movable drip catcher for use beneath the faucet of a bottled water dispenser comprising: a supporting framework having three equally spaced legs with two in the front and one in the rear; a T-shaped pan with vertical sides positioned beneath said faucet having a rear spout and an outward flange at the top of said sides; a horizontal reference line lying along the drain surface of said pan and extending forward from the area of said spout; a metal strap horizontally curled into almost a circle around said pan and underneath said flange so that both ends of said strap extend laterally near said spout from said pan with one end resting against the rear of one of said front legs; and a hinge uniting the other end of said strap to the other front leg and the upper portion of the axis of said hinge so tilted forwardly that the vertical planes passing through said axis and said line intersect forward of said spout, whereby said pan is rearwardly rotatable from beneath said faucet without spilling any water therefrom.

4. A drip catcher for use with a faucet comprising: a pan normally positioned beneath said faucet and disposed to allow spillage therefrom; and mounting means for supporting said pan, said mounting means having a pivotal connection with its axis tilted upwardly inward towards said pan such that a vertical plane containing said axis passes on the pan side of the point of spillage and allowing away movement of said pan from said normal position in the general direction of said spillage thereby causing said pan to be tilted during said away movement to prevent spillage therefrom and to be automatically returned to said normal position by gravity.

5. A drip catcher for use with a faucet comprising: a pan normally positioned beneath said faucet with a lowermost drain surface and an exit portion disposed to allow spillage therefrom and mounting means including hinge means for supporting said pan and allowing pivotal movement thereof away from said normal position in a direction wherein said exit portion leads said lowermost drain surface and return movement to said normal position in a direction wherein said exit portion trails said lowermost drain surface, said hinge means having its axis tilted from the vertical such that a vertical plane containing said axis intersects a vertical plane containing said exit portion and said lowermost drain surface on the return direction side of said exit portion when said pan is in said normal position whereby said exit portion is tipped upwardly with respect to said pan during said movement to prevent spillage therefrom.

6. A drip catcher for use with a faucet comprising: a framework for supporting said drip catcher; a pan normally positioned beneath said faucet and having an exit portion below the uppermost portion of the rim thereof; a support member for supporting said pan; and means for pivotally connecting said support member to said framework to allow away movement of said pan from said normal position in a direction wherein said exit portion leads the remainder of said pan and return movement to said normal position, said connecting means having an axis disposed generally vertical but tilted upwardly inward toward said pan such that a vertical plane containing said axis intersects a vertical plane through said pan and containing said exit portion on the pan side of said exit portion.

7. A drip catcher for use with a faucet comprising: a framework for supporting said drip catcher; a pan normally positioned beneath said faucet and having a lowermost drain surface and an exit portion which is normally disposed to allow spillage therefrom; a support member for supporting said pan; means for pivotally connecting said support member to said framework to allow away movement of said pan from said normal position in a direction wherein said exit portion leads said lowermost drain surface and return movement to said normal position in a direction wherein said exit portion trails said lowermost drain surface; said connecting means having an axis disposed generally vertical but tilted upwardly inward toward said pan such that a vertical plane containing said axis intersects a vertical plane containing said exit portion and said lowermost drain surface on the return direction side of said exit portion when said pan is in said normal position whereby said exit portion is tipped upwardly during said away movement to prevent spillage therefrom and is automatically returned to said normal position by gravity; and limiting means which engage said framework and limit the movement of said pan at each of said positions.

8. A drip catcher for use with a faucet comprising: a pan having a rearwardly directed exit and formed with the lowermost drain surface comprising a horizontal reference line extending from inside said pan to the spill edge of said exit; and mounting means including a hinge for supporting said pan and allowing pivotal movement thereof from said normal position to a position removed from beneath said faucet, said hinge having its axis tilted from the vertical such that the vertical planes passing through said axis and said line intersect forward of said exit whereby said pan is tilted during said pivotal movement to prevent spillage from said exit.

9. A drip catcher for use with a faucet comprising: a framework for supporting said drip catcher having three equally spaced legs; a pan normally positioned beneath said faucet and having a rearwardly directed exit portion so disposed that a generally horizontal reference line lies along said bottom from the front portion to said exit portion; a support member for supporting said pan; a hinge connecting said support member to a first of said legs and allowing pivotal movement of said pan rearwardly from said normal position to a position removed from beneath said faucet, said hinge being positioned rearwardly and outwardly from said pan and having the upper portion of its axis tilted forwardly and inwardly from the vertical such that vertical planes passing through said axis and said line intersect forward of said exit portion whereby said pan is tilted during said movement to prevent spillage therefrom and is automatically returned to said normal position by gravity; and limiting means on said support member for engaging a second of said legs when said pan is pivotally moved to said removed position to limit said pivotal movement and engaging a third of said legs when said pan is returned to said normal position to assure proper positioning beneath said faucet.

References Cited in the file of this patent

UNITED STATES PATENTS

| | | |
|---|---|---|
| 1,256,206 | Cordley | Feb. 12, 1918 |
| 1,660,074 | Hagg | Feb. 21, 1928 |